United States Patent Office 3,338,900
Patented Aug. 29, 1967

3,338,900
ADAMANTYLAMINO (AND PIPERAZINO)-5,11-DI-HYDRO-DIBENZ[b,e][1,4]OXAZEPINES
Jack Bernstein, New Brunswick, N.J., assignor, by mesne assignments, to E. R. Squibb & Sons, Inc., New York, N.Y., a corporation of Delaware
No Drawing. Filed July 26, 1965, Ser. No. 474,976
10 Claims. (Cl. 260—268)

This invention relates to new compounds of the formula (I)

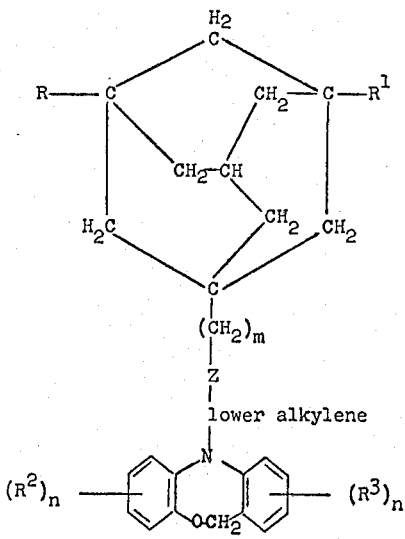

and to acid-addition and quaternary ammonium salts thereof.

In Formula I, R and $R^1$ each is hydrogen, halo, lower alkyl, phenyl, or lower alkoxy. $R^2$ is hydrogen, halo or trifluoromethyl. $R^3$ is hydrogen, halogen, trifluoromethyl, lower alkyl, lower alkoxy, dimethylsulfamyl, trifluoromethylmercapto and trifluoromethoxy; $m$ is 0, 1 or 2 and $n$ is 1, 2 or 3; Z represents a nitrogen containing group such as (II)

N—$R^4$ wherein $R^4$ is hydrogen or lower alkyl, or a nitrogen heterocyclic such as piperazino or carbon substituted piperazino, e.g., lower alkylpiperazino such as 2- or 3-methylpiperazino, and di - lower - alkylpiperazino such as 2,5-dimethylpiperazino, the attachment to the alkylene group being through a nitrogen atom.

The halogens represented by R, $R^1$, $R^2$ and $R^3$ include chlorine, bromine, iodine and fluorine, but the first two are preferred. Lower alkyl groups represented by the symbols include straight and branched chain aliphatic groups such as methyl, ethyl, propyl, isopropyl, butyl, isobutyl, t-butyl, amyl, isoamyl and the like. Methyl and ethyl are preferred. The lower alkoxy groups are ether groups having alkyl groups of the foregoing character attached to the oxygen.

The lower alkylene groups are straight or branched chain, divalent aliphatic hydrocarbon groups of the same type as the lower alkyl groups referred to above. Two to three carbon chains are preferred.

The new compounds of this invention may be produced by a variety of methods. According to one method, a substituted adamantanamine, i.e., one in which R, $R^1$ or $R^4$ stituted or unsubstituted adamantanamine, i.e., one in which R, $R^1$ or $R^4$ are hydrogen or any of the other substituents represented by the respective symbols, is reacted with a haloacyl halide to obtain a haloalkanoyl adamantanamine which is reduced, e.g., with lithium aluminum hydride, to the corresponding adamantylaminoalkyl halide. This is then reacted with a substituted or unsubstituted 5,11-dihydrodibenz[b,e][1,4]oxazepine to obtain the product of Formula I.

Alternatively, the same starting material is converted to an adamantylamino alkanol, e.g., with an alkylene oxide such as ethylene oxide or the like, and the alkanol is converted to the corresponding alkyl halide, e.g., with a thionyl halide such as thionyl chloride or thionyl bromide. This product is then reacted with a substituted or unsubstituted 5,11-dihydrodibenz[b,e][1,4]oxazepine to obtain the same product as by the first procedure.

Suitable starting materials for compounds of Formula I include, for example, 1-adamantylamine, 3-methyl-1-adamantylamine, 3-phenyl-1-adamantylamine, 3-methoxy-1-adamantylamine, 3-fluoro-, 3-chloro-, 3-bromo- and 3-iodo-1-adamantylamine, 3,5 - dimethyl - 1 - adamantylamine as well as the adamantyl-loweralkylamines and N-alkyl compounds corresponding to the above.

These amines may be prepared by the reduction of an N - acyl - adamantylamine such as N-(1-adamantyl)acetamide with lithium aluminum hydride or by the alkylation of an adamantylamine such as 1 - adamantylamine with an alkyl halide such as methyl iodide.

A further alternate synthesis comprises reacting an N-alkylacylamide, such as N-ethylacetamide, with a haloadamantane such as 1-bromoadamantane and hydrolyzing the N-ethyl-N-(1-adamantyl)-acetamide to the corresponding N-ethyl-1-adamantylamine.

Reduction of an adamantanecarboxamide such as N-methyl-1-adamantanecarboxamide, with lithium aluminum hydride yields suitable starting amines for those derivatives in which $m$ is 1. Similarly, the reduction of an adamantylacetamide yields derivatives in which $m$ is 2.

Dihydrodibenzoxazepines which may be utilized to produce compounds of Formula I include, for example, 5,11-dihydrodibenz[b,e][1,4]oxazepine,
3-chloro-5,11-dihydrodibenze[b,e][1,4]oxazepine,
3-trifluoromethyl-5,11-dihydrodibenz[b,e][1,4]oxazepine,
7-methyl-5,11-dihydrodibenz[b,e][1,4]oxazepine,
3,7-dichloro-5,11-dihydrodibenz[b,e][1,4]oxazepine,
7-methoxy-5,11-dihydrodibenz[b,e][1,4]oxazepine,
3-trifluoromethoxy-5,11-dihydrodibenz[b,e][1,4]oxazepine,
3-trifluoromethylmercapto-5,11-dihydrodibenz[b,e][1,4]oxazepine, and
3-dimethylsulfamyl-5,11-dihydrodibenz[b,e][1,4]oxazepine.

Preferred compounds of this invention are those wherein Z represents -N-methyl or piperazinyl, the lower alkylene group has 2 to 3 carbon atoms and R, $R^1$, $R^2$, and $R^3$ are all hydrogen.

The bases of Formula I form acid-addition salts with a variety of inorganic and organic acids. Such salts include, for example, the hydrohalides, e.g., hydrochloride, hydrobromide, etc., sulfate, phosphate, nitrate, arylsulfonates, e.g., camphorsulfonate, benzenesulfonate, toluenesulfonate, etc., citrate, oxalate, ascorbate, maleate, acetate, tartrate, salicylate and the like. It is frequently convenient to isolate the compound by forming the acid salt and precipitating in a medium in which it is insoluble. The free base may then be obtained by neutralization. The bases also form quaternary ammonium salts with quaternizing agents which are acceptable for pharmaceutical use, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate, or the like.

The compounds of this invention are therapeutically active substances which possess central depressant activity and antihistaminic activities. They are useful in the treatment of conditions such as allergies, Parkinsonism or as tranquilizers or sedatives. They may be administered orally or parenterally in the form of tablets, capsules, elixirs, injectables or the like by incorporating the appropriate dosage (e.g., about 10 to 250 mg.) of the base of Formula I or a physiologically acceptable acid-addition salt or quaternary ammonium salt thereof in a conventional vehicle together with excipients, lubricants, preservatives, stabilizers and the like, as required according to accepted pharmaceutical practice.

The following examples are illustrative of the invention. All temperatures are expressed on the centigrade scale.

EXAMPLE 1

*Preparation of 5-[3-(N-methyl - 1 - adamantylamino) propyl]-5,11-dihydrodibenz[b,e][1,4]oxazepine hydrochloride*

(A) PREPARATION OF N-(1-ADAMANTYL)-3-CHLORO-N-METHYLPROPIONAMIDE

With ice-cooling and stirring, 37.1 grams of β-chloropropionyl chloride in 100 ml. of anhydrous benzene is added dropwise to 100 grams of 1-(methylamino)adamantane in 200 ml. of anhydrous benzene. The reaction mixture is then refluxed for 5 hours, filtered and the filtrate washed with water and dried over anhydrous magnesium sulfate. The ether is removed by distillation of the N-(1-adamantyl) - 3 - chloro-N-methylpropionamide, and this product may be used without further purification. If desired, the product may be purified by fractional distillation.

(B) PREPARATION OF N-(3-CHLOROPROPYL)-N-METHYL-1-ADAMANTANAMINE

To 3.8 grams of lithium aluminum hydride in 200 ml. of anhydrous ether is added dropwise a solution of 25 grams of N-(1-adamantyl) - 3 - chloro-N-methylpropionamide in 400 ml. of anhydrous ether. The mixture is then refluxed for 1 hour, cooled in ice, treated with 2.5 ml. of water and then 2.5 ml. of 20% aqueous sodium hydroxide. The mixture is filtered and dried over anhydrous potassium carbonate. The ether is removed by distillation and the residue is fractionally distilled under reduced pressure to yield the desired N-(3-chloropropyl)-N-methyl-1-adamantanamine.

(C) PREPARATION OF 5-[3-(N-METHYL-1-ADAMANTYLAMINO)PROPYL] - 5,11 - DIHYDRODIBENZ[b,e][1,4]OXAZEPINE HYDROCHLORIDE

A mixture of 4.9 grams of 5,11-dihydrodibenz[b,e] [1,4]oxazepine, 1.5 grams of a 50% dispersion of sodium hydride in mineral oil and 50 ml. of tetrahydrofuran is stirred for 1 hour while nitrogen is bubbled through the mixture. To this mixture there is added dropwise with vigorous stirring a solution of 18 grams of N-(3-chloropropyl)-N-methyl-1-adamantanamine in tetrahydrofuran. The reaction mixture is refluxed for 3 hours and filtered. The filtrate is concentrated, dissolved in ether and extracted with 10% phosphoric acid. The acid extracts are made basic and extracted with ether. The ether extracts are dried over anhydrous magnesium sulfate and concentrated to yield the desired 5-[3-(N-methyl-1-adamantylamino)propyl]-5,11-dihydrodibenz[b,e][1,4]oxazepine.

To a cooled solution of the base in anyhdrous ether, there is added an equivalent amount of an ethereal solution of hydrogen chloride. The precipitated solid is filtered and recrystallized from a mixture of ethanol and anhydrous ether to yield the hydrochloride salt of 5-[3-(N-methyl - 1 - adamantylamino)propyl]-5,11-dihydrodibenz[b,e][1,4]oxazepine.

EXAMPLE 2

*Preparation of 5-[2-(N-methyl-1-adamantylamino)ethyl]-5,11-dihydrodibenz[b,e][1,4]oxazepine, maleic acid salt*

(A) PREPARATION OF 2-(N-METHYL-1-ADAMANTYL-AMINO)ETHANOL

A 140 ml. stainless steel bomb is charged with 16.5 grams of N-methyl-1-adamantylamine, 5.0 grams of ethylene oxide and 50 ml. of aqueous tetrahydrofuran and heated at 70° for 12 hours. The solvent is removed by distillation and the residue fractionally distilled to yield the desired 2-(N-methyl-1-adamantylamino)ethanol.

(B) PREPARATION OF N-(2-BROMOETHYL)-N-METHYL-1-ADAMANTYLAMINE HYDROBROMIDE

A solution of 20.9 grams of 2-(N-methyl-1-adamantylamino)ethanol in 100 ml. of chloroform is cooled to 0° and a solution of 30 grams of thionyl bromide in 150 ml. of chloroform added dropwise with vigorous stirring, while the temperature is maintained at 0–5°. The reaction mixture is allowed to warm to room temperature, diluted with anhydrous ether and filtered to recover the N-(2-bromoethyl)-N-methyl-1-adamantylamine, hydrobromide. This may be recrystallized from a mixture of ethanol and ether.

(C) PREPARATION OF 5-[2-(N-METHYL-1-ADAMANTYLAMINO)ETHYL] - 5,11 - DIHYDRODIBENZ[b,e][1,4]OX-AZEPINE, MALEIC ACID SALT

A mixture of 4.9 grams of 5,11-dihydrodibenz[b,e] [1,4]oxazepin, 1.5 grams of a 50% dispersion of sodium hydride in mineral oil and 50 ml. of tetrahydrofuran is stirred for 1 hour, while nitrogen is allowed to bubble through the mixture. To this mixture there is then added dropwise with vigorous stirring a solution of 20 grams of N-(2-bromoethyl)-N-methyl-1-adamantanamine in tetrahydrofuran. The reaction mixture is then refluxed for 3 hours and filtered. The filtrate is concentrated, dissolved in ether and extracted with 10% phosphoric acid. The acid extracts are made basic and extracted with ether. The ether extracts are dried over anhydrous magnesium sulfate, and concentrated to yield the desired 5-[2-(N-methyl-1-adamantylamino)ethyl] - 5,11 - dihydrodibenz-[b,e][1,4]oxazepine.

To a solution of the base in anhydrous ether there is then added a solution of maleic acid in acetone. The addition of ether completes the precipitation of the salt, which may be recrystallized from a mixture of ethanol and ether.

Following the procedure of Example 2 but substituting the indicated dibenzoxazepine for the 5,11-dibenz[b,e] [1,4]oxazepine in part (C), there is formed the designated 5-[2-(N-methyl-1-adamantylamino)ethyl]-$R^2$, $R^3$-5,11-dihydrodibenz[b,e][1,4]oxazepine, maleic acid salt.

| Ex. | Reactant | Product |
| --- | --- | --- |
| 3 | 3-chloro-5,11-dibenzoxazepine | $R^2$=3-Cl; $R^3$=H |
| 4 | 3-trifluoromethyl-5,11-dibenzoxazepine. | $R^2$=3-CF$_3$; $R^3$=H |
| 5 | 7-methyl-5,11-dibenzoxazepine | $R^2$=H; $R^3$=7-CH$_3$ |
| 6 | 3,7-dichloro-5,11-dibenzoxazepine. | $R^2$=3-Cl; $R^3$=7-Cl |
| 7 | 7-methoxy-5,11-dibenzoxazepine | $R^2$=H; $R^3$=7-CH$_3$O |
| 8 | 3-trifluoromethoxy-5,11-dibenzoxazepine. | $R^2$=CF$_3$O; $R^3$=H |
| 9 | 3-trifluoromethylmercapto-5,11-dibenzoxazepine. | $R^2$=CF$_3$-S; $R^3$=H |
| 10 | 3-dimethylsulfamyl-5,11-dibenzoxazepine. | $R^2$=(CH$_3$)$_2$NSO$_2$; $R^3$=H |

EXAMPLE 11

*Preparation of 5-[2-(N-ethyl-3-methyl - 1 - adamantylamino)ethyl] - 5,11 - dihydrodibenz[b,e][1,4]oxazepine, maleic acid salt*

(A) PREPARATION OF 1-ETHYLAMINO-3-METHYLADAMANTANE

A mixture of 60 grams of N-ethylacetamide, 45 grams of 1-bromo-3-methyladamantane and 60 grams of silver sulfate is heated at 100° for 1 hour. The cooled mixture is treated with 100 ml. of water and extracted with ether. The ether extracts are combined, dried over anhydrous magnesium sulfate and concentrated under reduced pressure to yield 1-(N-ethylacetamido)-3-methyladamantane.

A mixture of 12 grams of 1-(N-ethylacetamido)-3-methyladamantane, 12 grams of sodium hydroxide and 120 ml. of diethylene-glycol is refluxed for 5 hours. The cooled mixture is poured into 1 liter of water and extracted with ether. The combined ether extracts are dried over anhydrous potassium carbonate and the ether then removed by distillation to yield the the 1-ethylamino-3-methyladamantane.

(B) PREPARATION OF 5-[2-(N-ETHYL - 3 - METHYL-1-ADAMANTYLAMINO) - ETHYL]-5,11-DIHYDRODIBENZ-[b,e][1,4]OXAZEPINE, MALEIC ACID SALT

Following the procedure of Example 2 but substituting an equivalent amount of the 1-ethylamino-3-methyladamantanamine for the N-methyl-1-adamantylamine in part (A), there is obtained 5-[2-(N-ethyl-3-methyl-1-adamantylamino)ethyl] - 5,11 - dihydrodibenz - [b,e][1,4]oxazepine, maleic acid salt.

EXAMPLE 12

*Preparation of 5-[3-(N-methyl-3-methoxy-1-adamantylmethylamino) - propyl] - 5,11-dihydrodibenz[b,e][1,4] oxazepine hydrochloride*

(A) PREPARATION OF N-METHYL-3-METHOXY-1-ADAMANTANECARBOXAMIDE

A mixture of 10 grams of 3-methoxy-1-adamantanecarboxylic acid and 20 ml. of thionyl chloride are heated under reflux for 30 minutes. The excess thionyl chloride is removed by distillation under reduced pressure. Ten ml. of anhydrous benzene is added and the benzene removed by distillation under reduced pressure. The cooled residue is treated with a solution of methylamine in benzene. After several hours, the precipitated solid is removed by filtration, and the filtrate concentrated under reduced pressure to yield N-methyl-3-methoxy-1-adamantanecarboxamide.

(B) PREPARATION OF N-(3-METHOXY-1-ADAMANTYL-METHYL)METHYLAMINE

A solution of 10 grams of N-methyl-3-methoxy-1-adamantanecarboxamide in anhydrous ether is added slowly to a suspension of lithium aluminum hydride in anhydrous ether. After the addition is completed, the reaction mixture is heated to gentle reflux for 4 hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous magnesium sulfate and concentrated under reduced pressure to yield the N-(3-methoxy-1-adamantylmethyl)methylamine.

(C) PREPARATION OF 5-[3-(N-METHYL-3-METHOXY-1-ADAMANTYLMETHYLAMINO)PROPYL] - 5,11 - DIHYDRODIBENZ[b,e][1,4]OXAZEPINE HYDROCHLORIDE

Following the procedure of Example 1 but substituting an equivalent amount of N-(3-methoxy-1-adamantylmethyl)methylamine for the 1-methylaminoadamantane in part (A), there is obtained 5-[3-N-methyl-3-methoxy-1-adamantaylmethylamino)propyl] - 5,11 - dihydro-dibenz [b,e][1,4]oxazepine hydrochloride.

Similarly, by replacing the 3-methoxy-1-adamantanecarboxylic acid with an equivalent amount of 3-phenyl-1-adamantanecarboxylic acid in part (A), there is obtained 5 - [3-(N-methyl-3-phenyl-1-adamantylmethylamino)propyl] - 5,11-dihydrodibenz[b,e][1,4]oxazepine hydrochloride. Replacement with 3-bromo-1-adamantanecarboxylic acid yields the corresponding 5-[3-(N-methyl-3-bromo-1-adamantylmethylamino)propyl] - 5,11 - dihydrodibenz [b,e][1,4]oxazepine hydrochloride.

EXAMPLE 13

*Preparation of 5-{3-[4-(1-adamantylmethyl)-1-piperazinyl]propyl}-5,11-dihydrodibenz[b,e][1,4]oxazepine dihydrochloride*

(A) PREPARATION OF 4-(1-ADAMANTANECARBONYL) 1-BENZYLPIPERAZINE HYDROCHLORIDE

A solution of 99 grams of 1-adamantanecarboxylic acid chloride in 1 liter of anhydrous benzene is added dropwise with vigorous stirring to a solution of 88 grams of N-benzylpiperazine in 1 liter of anhydrous benzene. The reaction mixture is then heated to reflux for 2 hours and cooled. Anhydrous ether is added to complete the precipitation of the hydrochloride of 4-(1-adamantanecarbonyl)-1-benzylpiperazine. This is purified by crystallization from a mixture of absolute alcohol and anhydrous ether.

(B) PREPARATION OF 1-(1-ADAMANTANECARBONYL) PIPERAZINE

To a solution of 20 grams of 4-(1-adamantanecarbonyl)-1-benzylpiperazine hydrochloride in 100 ml. of glacial acetic acid there is added 5 grams of 5% palladium on carbon catalyst and the mixture shaken in an atmosphere of hydrogen under 50 p.s.i. initial pressure until the theoretical amount of hydrogen has been absorbed. The mixture is then filtered and the acetic acid removed by distillation under reduced pressure to yield the hydrochloride of 1-(1-adamantanecarbonyl)piperazine. This hydrochloride is purified by crystallization from a mixture of absolute alcohol and anhydrous ether.

The purified hydrochloride is dissolved in water and the aqueous solution saturated with potassium carbonate. The mixture is then extracted several times with anhydrous ether, the ether extracts combined, dried over solid potassium carbonate and then concentrated under reduced pressure to yield the desired 1-(1-adamantanecarbonyl)piperazine.

(C) PREPARATION OF 1-(1-ADAMANTYLMETHYL) PIPERAZINE

To a suspension of 3.8 grams of lithium aluminum hydride in 200 ml. of anhydrous ether is added dropwise a solution of 15 grams of 1-(1-adamantanecarbonyl)piperazine in 400 ml. of anhydrous ether. The mixture is then refluxed for 1 hour, cooled in ice and treated with 2.5 ml. of water followed by 2.5 ml. of 20% aqueous sodium hydroxide. The mixture is filtered and dried over anhydrous potassium carbonate. The ether is removed by distillation and the residue is fractionally distilled under reduced pressure to yield the desired 1-(1-adamantylmethyl)piperazine.

(D) PREPARATION OF 3-[4-(1-ADAMANTYLMETHYL) 1-PIPERAZINYL]PROPYL CHLORIDE

To a solution of 31.5 grams of trimethylene chlorobromide in 150 ml. of anhydrous ether there is added dropwise with vigorous stirring and cooling (0–5°) a solution of 88 grams of 1-(1-adamantylmethyl)piperazine in anhydrous ether. The mixture is then refluxed gently for 6 hours, and cooled. The hydrobromide of 1-(1-adamantylmethyl)piperazine is removed by filtration and the filtrate is treated with 150 ml. of 20% hydrochloric acid. The acid extract is cooled, made basic by the careful addition of solid potassium carbonate and extracted several times with ether. The combined ether extracts are dried over anhydrous potassium carbonate and concentrated. The residue is distilled under reduced pressure to yield the desired 3-[4-(1-adamantylmethyl)-1-piperazinyl]propyl chloride.

(E) PREPARATION OF 5-{3-[4-(1-ADAMANTYLMETHYL) 1 - PIPERAZINYL]PROPYL} - 5,11 - DIHYDRODIBENZ [b,e][1,4]OXAZEPINE DIHYDROCHLORIDE

Following the procedure of Example 1(C), but substituting an equivalent quantity of 3-[4-1-adamantylmethyl)-1-piperazinyl]-propyl chloride for the N-(3-chloropropyl-N-methyl-1-adamantanamine, there is obtained 5-{3-[4-

(1 - adamantylmethyl) - 1 - piperazinyl]propyl}5,11-dihydrodibenz[b,e][1,4]oxazepine dihydrochloride.

Similarly, by substituting 1-adamantylacetyl chloride for the 1-adamantanecarboxylic acid chloride in part (A) and following the procedure of Example 13, there is obtained 5 - {3 - [4 - (2 - [1 - adamantyl]ethyl) - 1 - piperazinyl]propyl} - 5,11 - dihydrodibenz[b,e][1,4] - oxazepine dihydrochloride.

Additional compounds of Formula I may be similarly synthesized by the foregoing procedures by utilizing other appropriately substituted starting materials.

What is claimed is:

1. A member selected from the group consisting of compounds of the formula

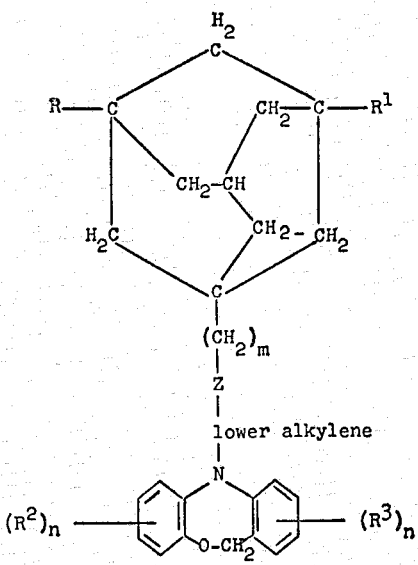

wherein R and $R^1$ each is a member of the group consisting of hydrogen, halo, lower alkyl, phenyl and lower alkoxy, $R^2$ is a member of the group consisting of hydrogen, halo and trifluoromethyl, $R^3$ is a member of the group consisting of hydrogen, halo, trifluoromethyl, lower alkyl, lower alkoxy, dimethylsulfamyl, trifluoromethylmercapto and trifluoromethoxy, Z is a member of the group consisting of amino, lower alkylamino, piperazino, lower alkyl piperazino and di-lower alkylpiperazino, $m$ is an integer from 0 to 2 and $n$ is an integer from 1 to 3, and acid-addition and quaternary ammonium salts thereof.

2. A compound of the formula

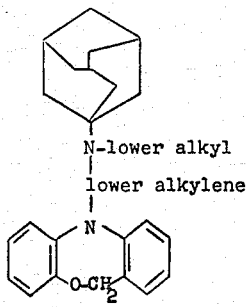

3. A compound of the formula

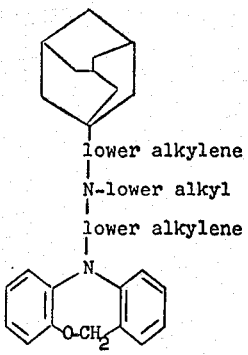

4. A compound of the formula

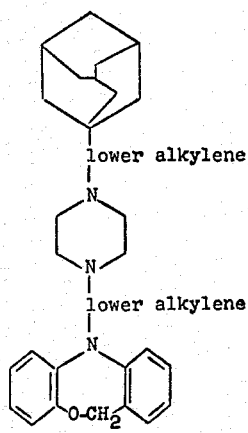

5. 5 - [3 - (N - methyl - 1 - adamantylamino)propyl]-5,11-dihydrodibenz[b,e][1,4]oxazepine.

6. 5 - [2 - (N - methyl - 1 - adamantylamino)ethyl]-5,11 - dihydrodibenz[b,e][1,4] oxazepine.

7. Maleic acid salt of the compound of claim 6.

8. 5 - [2 - (N - ethyl - 3 - methyl - 1 - adamantylamino) ethyl]-5,11-dihydrodibenz[b,e][1,4]oxazepine.

9. 5 - [3 - (N - methyl - 3 - methoxy - 1 - adamantylmethylamino)propyl] - 5,11 - dihydrodibenz[b,e][1,4] oxazepine.

10. 5 - {3 - [4 - (1 - adamantylmethyl) - 1 - piperazinyl]propyl}-5,11-dihydrodibenz[b,e][1,4]oxazepine.

References Cited

UNITED STATES PATENTS 3,133,936  5/1964  Yale et al. _____ 260—333
3,188,322  6/1965  Yale et al. _____ 260—327

ALEX MAZEL, *Primary Examiner.*

HENRY R. JILES, *Examiner.*